Nov. 26, 1935.  R. B. OTWELL  2,022,548
DIVISIBLE FLAT FOR GREENHOUSES
Filed June 8, 1935
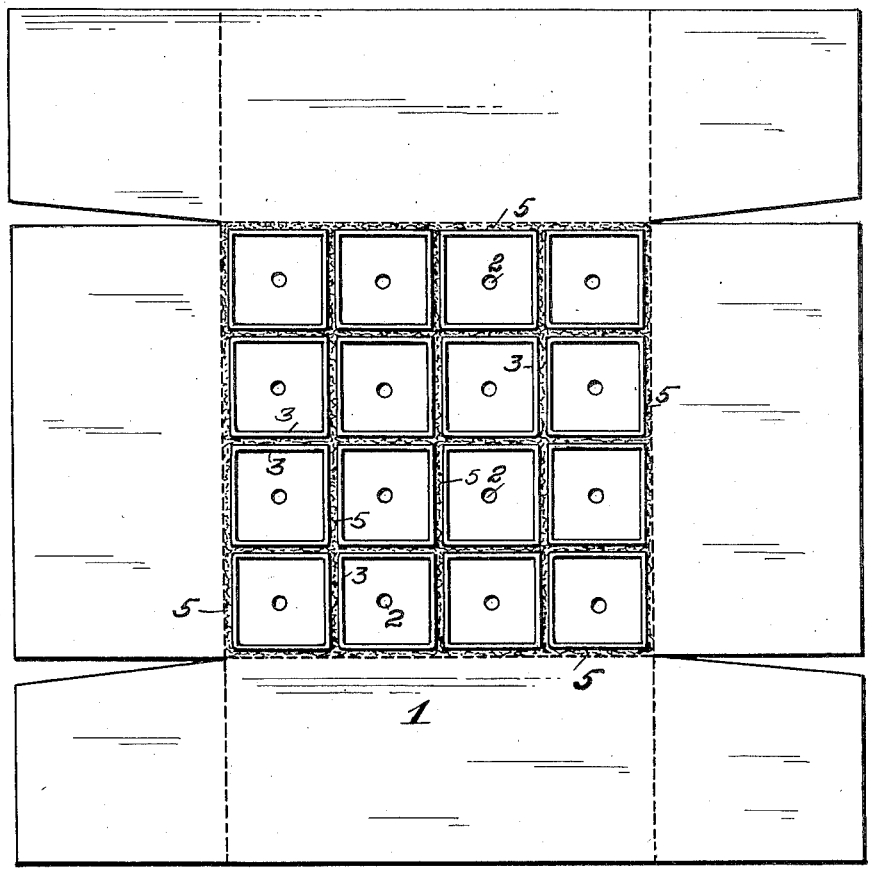
Inventor
Ralph B. Otwell
By S. E. Thomas
Attorney Patented Nov. 26, 1935

2,022,548

UNITED STATES PATENT OFFICE 2,022,548

DIVISIBLE FLAT FOR GREENHOUSES

Ralph B. Otwell, Detroit, Mich.

Application June 8, 1935, Serial No. 25,543

5 Claims. (Cl. 47—37)

This invention relates to an improvement in "flats"—or the trays employed by greenhouse and nurserymen for germinating seed.

The invention herein disclosed is a further development of that shown in Patents No. 1,959,139, dated May 15, 1934, and No. 1,993,620, dated March 5, 1935. In the last named patent, the walls of the individual plant containers or cells are impregnated with paraffin or other substance of a similar nature, being held together thereby in detachable contacting relation, throughout their entire height, with similar cells to form a "flat."

Seeds thus bedded are germinated in their individual cells—under glass as in the usual wooden flat or tray employed in greenhouses or in the "open", and the plants while still in their individual containers or cells, may later be transferred to the soil of a permanent location.

It has however been found in practice that while the plant containers or cells may be readily separated from each other by the insertion of a knife blade or spatula, it is sometimes difficult to insure perfect alignment of the plant containers or cells, in rows. The wall of one cell or plant container may slightly overlap the line of demarcation between the contiguous walls of adjacent cells and thus project on one side or the other of an overlapping cell. In which case it will be apparent that upon attempting to insert a blade or spatula between the cells to separate them from the remaining cells of the flat, the knife would encounter the overlapping wall of a cell which may be slightly out of alignment with the line of demarcation between other adjacent cells, thereby preventing the separation of the required number of cells.

One object of the present invention therefore is to provide for the ready insertion of a knife blade between the adjacent rows of plant containers without injury to the roots or disturbing the soil, so that any desired number of containers housing plants may be readily separated from the remainder of those comprising the "flat."

A further object of the present invention is to provide means whereby the young plant upon sprouting or pushing its stem above the surface of the soil may be protected from injury in shipment or until it is transplanted to a new environment.

Another object of the invention is to provide for the drainage of the several plants pending their permanent "bedding" in a new location.

A further object is to provide an inclosing wall or box which will assist in supporting the cells, and also prevent the escape of soil through the openings provided in the walls of the cells for the passage of roots into the soil of the seed bed when in their permanent location.

With the foregoing and other objects in view, which will appear as the description proceeds, the invention further resides in the details of construction hereinafter described and claimed, it being understood that changes may be made in the precise embodiment of the invention herein disclosed without departing from the spirit of the same.

In the drawing accompanying this specification:—

Figure 1 is a plan view of a divisible flat, comprising a group of plant containers, secured temporarily together,—preferably along the top and lower edges of the cells,—leaving an intermediate unattached portion in spaced relation to each other for the insertion of a knife blade between the plant cells, whereby any required number of cells may be readily separated from the remainder of the flat.

Figure 2 is a cross-sectional view through a row of cells containing plants, detachably secured to the perforated bottom of an inclosing box, the side walls of the latter being detachably secured to the outside wall of the outer row of cells of the flat, the walls of the box being inclosed by a cover having an overlapping horizontal flange,—designed to support like "flats" laid thereon, and to protect the young plants from injury through contact with the one above in shipment.

Figure 3 is a perspective view of one of the plant containers, showing a band of asphaltum, or other adhesive substance at the top and bottom of the cell, for temporarily uniting the cells together as a unitary structure or flat.

Referring now to the reference numerals placed upon the drawing:

The numeral 1, indicates a paper blank, forming the bottom and side walls of a box. The bottom of the box is punched with a plurality of drainage openings 2, which register centrally with the respective plant cells 3,—supported by and detachably connected with the bottom or the floor of the box.

The numeral 5, denotes one or more bands of asphaltum, preferably encircling the plant cells, whereby the cells are detachably secured together in contiguous but spaced relation, to permit the insertion between the cells of a knife blade or spatula, whereby one or more cells may be readily separated from the remaining plant cells forming the flat.

A cover 6, incloses the upper portion of the walls of the box,—having an annular flange 7, bounding a central opening 8,—through which the young plants 9,—bedded in the soil 10, of the cells, may receive light and air to promote their growth, and through which the plants may be watered.

It will be obvious that plants raised in the cells may be shipped from nurseries or greenhouses in said containers, and when received may be placed on display in the box, with one or more of the sides of the latter bent downwardly, whereby a knife blade may be inserted between the spaced walls of the plant containers for separating one or more of the latter from those forming the balance of the flat.

The walls of the box serve to support the plant cells in grouped relation and also provide means for preventing the soil working out through the root openings 4, in the walls of the plant cells.

What I claim is:

1. A planting unit for gardens comprising a tubular cartridge, open at each end and of uniform cross-sectional area throughout, adapted to be grouped with similar units in rows; means for detachably connecting the several cartridges together at spaced intervals to form a divisible flat, leaving portions of each cartridge unconnected with the walls of adjacent cartridges, whereby a knife blade or spatula may be readily inserted between the walls to separate by prying one or more cartridges from the remaining group of cartridges.

2. A planting unit for gardens comprising a tubular container, open at each end, adapted for grouping in adjacent relation with similar units in rows; means for detachably connecting the several units together in rows, leaving portions of the walls of the containers in spaced relation to each other, whereby a knife blade may be inserted between the spaced walls of contiguous units to pry one or more units from the remaining group of containers.

3. A planting unit for the germinating of seeds preparatory to planting in the ground, comprising a tubular container open at each end adapted to be grouped with like containers in rows, spaced slightly apart to receive a knife blade, whereby upon prying one or more of the containers may be separated from the remaining body of units, and adhesive means for detachably connecting the tubular units together in spaced relation to form a unitary flat.

4. Means for merchandising and planting individual plants in an embryo state, comprising a planting unit for the germination of seeds consisting of a tubular container open at each end, with openings through its side walls for the roots of the plant to enter the soil in which it is finally bedded; said tubular unit being detachably connected with other like units arranged in contiguous relation to form a flat, with the walls of the contiguous units spaced apart slightly that they may receive between them a knife blade or the like, whereby one or more of the units may be disunited from the remainder of said units forming the flat; and a floor plate coated with an adhesive, to detachably connect the edges of the respective units with the plate, said floor plate having drainage holes registering with the respective containers, and with side walls overlapping the walls of the outer row of containers, whereby the soil in the containers is held against escape through the holes provided for the passage of the roots into the ground in which the container is bedded.

5. Means for merchandising and planting individual plants in an embryo state, comprising a planting unit for the germination of seeds consisting of a tubular container open at each end, with openings through its side walls for the roots of the plant to enter the soil in which it is finally bedded; said tubular unit being detachably connected with other like units arranged in contiguous relation to form a flat, with the walls of the contiguous units spaced apart slightly that they may receive between them a knife blade or the like, whereby one or more of the units may be disunited from the remainder of said units forming the flat; a floor plate coated with an adhesive, to detachably connect the edges of the respective units with the plate, said floor plate having drainage holes registering with the respective containers, and with side walls overlapping the walls of the outer row of containers, whereby the soil in the containers is held against escape through the holes provided for the passage of the roots into the ground in which the container is bedded; and a cover plate overlapping said walls having an annular flange bounding a central opening through which the young plants may receive light, air and water, and through which the prospective buyer may examine the plants.

RALPH B. OTWELL